United States Patent [19]

St. Clair et al.

[11] Patent Number: 4,624,888

[45] Date of Patent: Nov. 25, 1986

[54] ACETYLENE (ETHYNYL) TERMINATED POLYIMIDE SILOXANE AND PROCESS FOR PREPARATION THEREOF

[75] Inventors: Terry L. St. Clair, Poquoson, Va.; Shubha Maudgal, New Delhi, India

[73] Assignee: The United States of America as represented by the Administrator of the National Aeronautics and Space Administration, Washington, D.C.

[21] Appl. No.: 781,813

[22] Filed: Sep. 30, 1985

[51] Int. Cl.⁴ .................... B32B 7/00; B32B 9/04
[52] U.S. Cl. ............................ 428/262; 428/447; 528/26
[58] Field of Search ............... 528/26; 428/262, 447

[56] References Cited

U.S. PATENT DOCUMENTS 3,740,305 6/1973 Hoback et al.
3,845,018 10/1974 Bilow et al.
3,864,309 2/1975 Bilow et al.
3,879,349 4/1975 Bilow et al.
3,966,729 6/1976 Kovar et al.
4,060,515 11/1977 D'Alelio ........................... 528/26
4,431,761 2/1984 Hergenrother et al. ............. 528/26
4,520,075 5/1985 Igarashi et al. .................. 428/435
4,590,122 5/1986 Levin ............................... 428/260
4,595,739 6/1986 Cavezzan ......................... 528/15

FOREIGN PATENT DOCUMENTS 8202688 2/1984 Netherlands ..................... 526/26

Primary Examiner—Lucille M. Phynes
Attorney, Agent, or Firm—George F. Helfrich; John R. Manning; Robert D. Marchant

[57] ABSTRACT

Siloxane-containing addition polyimides having improved physical property characteristics of flexibility, drape, tack and toughness and the process for preparing and utilizing same are disclosed.

5 Claims, No Drawings

ACETYLENE (ETHYNYL) TERMINATED POLYIMIDE SILOXANE AND PROCESS FOR PREPARATION THEREOF

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

Recent development in the field of polyimides may be traced to the need felt in aeronautics and space research for polymers with enhanced high temperature capabilities. Linear systems developed in the early research were impossible to process in high molecular weight imide form and were processed as polyamic acids, soluble only in high boiling solvents such as dimethylformamide (DMF), N-methylpyrrolidone (NMP), etc. which could not be easily removed because of their strong association with the polymer. Properties of the resultant structure also often suffered due to the presence of voids. Over the past decade, aromatic addition polyimides have been developed both as matrix and adhesive resins for applications on future aircraft and spacecraft. Additions polyimides offer distinct advantages over linear polyimides being processable in the form of short chained oligomers end-capped with latent crosslinking groups. By polymerizing this type of material "in place" it is useful as an adhesive. This same processing method may be used for the preparation of fiber reinforced composites where the polymerization encapsulates the reinforcement and is set.

One particularly attractive addition-type polyimide that is commercially available is Gulf Oil Chemical's Thermid 600 (now produced by National Starch) which has the following structure:

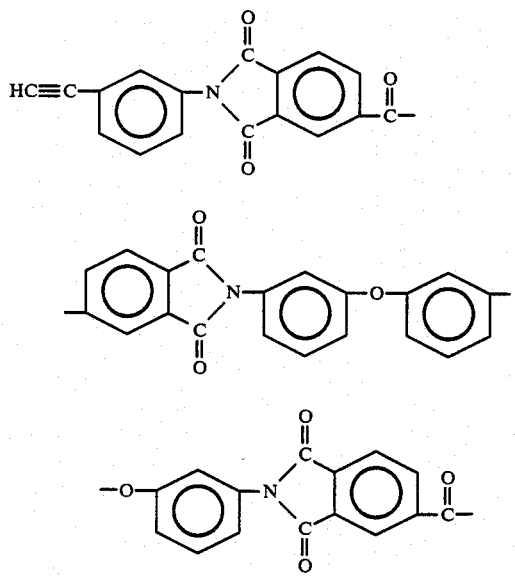

-continued

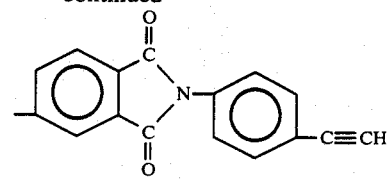

This polyimide is prepared by the reaction of an aromatic tetracarboxylic acid dianhydride with an aromatic diamine in the presence of an ethynyl-substituted aromatic monoamine to provide a fully imidized acetylene-terminated thermosetting polyimide resin. Unfortunately it is insoluble in all solvents except NMP at 100° C. leading back to the problems associated with this high boiling point polar solvent.

Addition polyimides of this type also tend to be highly crosslinked, insoluble and extremely brittle on curing. Efforts made to toughen addition polyimide adhesives for example, LARC-13, by physically blending fluorosilicone and vinyl terminated silicone rubbers have been partially successful as disclosed in U.S. Pat. No. 4,389,504.

There is thus a definite need in the art to toughen addition polyimides to provide such properties as increased peel strength, resistance to adhesive fracture and higher impact energy. There is also need for addition polyimides with improved solubility and processability.

Accordingly, an object of the present invention is the synthesis of addition-type polyimides with improved toughness.

Another object is the synthesis of an addition-type polyimide with improved solubility.

Another object of the present invention is a process for reducing the polymerization temperature of addition-type polyimides.

Another object of the present invention is a novel polyimide having a reduced melting temperature.

Another object of the present invention is a novel process for preparing scrim cloths by "melt-impregnation" without the use of additional solvents.

Another object of the present invention is to utilize the polymer as an adhesive in bonding various surfaces.

Another object of the present invention is a novel process of preparing prepregs for use in fabricating composite structures.

BRIEF SUMMARY OF THE INVENTION

According to the present invention, the foregoing and other objects are attained by employing a diaminosiloxane as the diamine portion of an acetylene terminated oligomer. Thus, the siloxane group is chemically incorporated into the backbone of the oligomer and results in improved solubility and flexibility thereof by virtue of the —Si—O—Si— linkage. This oligomer melts in the 125°–160° C. temperature range and undergoes cure between 190°–270° C. The oligomer may be extended using different proportions of an aromatic dianhydride and aminophenyl acetylene (APA). It may be further blended with commercially available polymers such as Thermid 600 with which it is fully compatible.

The process of the present invention involves the reaction of a diaminosiloxane with acetylene terminated anhydrides of varying chain lengths. Aminophenyl acetylene (APA) and an aromatic dianhydride are reacted in different molar ratios to develop ethynyl terminated anhydrides with a range of molecular weights. The following dianhydrides can be used:
(a) benzophenone tetracarboxylic dianhydride (BTDA)
(b) pyromellitic dianhydride (PMDA)
(c) oxydiphthalic anhydride (ODPA)
(d) 2,2-bis(3,4-dicarboxyphenyl)hexafluoropropane dianhydride (6F)
(e) 4,4′-bis(3,4-dicarboxyphenoxy)diphenyl sulfide dianhydride (BDSDA)

as well as others that would be obvious to those skilled in the art. The anhydride thus formed may be reacted with a diaminosiloxane to yield an acetylene terminated oligomer which on curing yields the acetylene terminated polyimide siloxane (ATPISi). The reaction scheme for the preparation of an exemplary acetylene terminated oligomer is as follows:

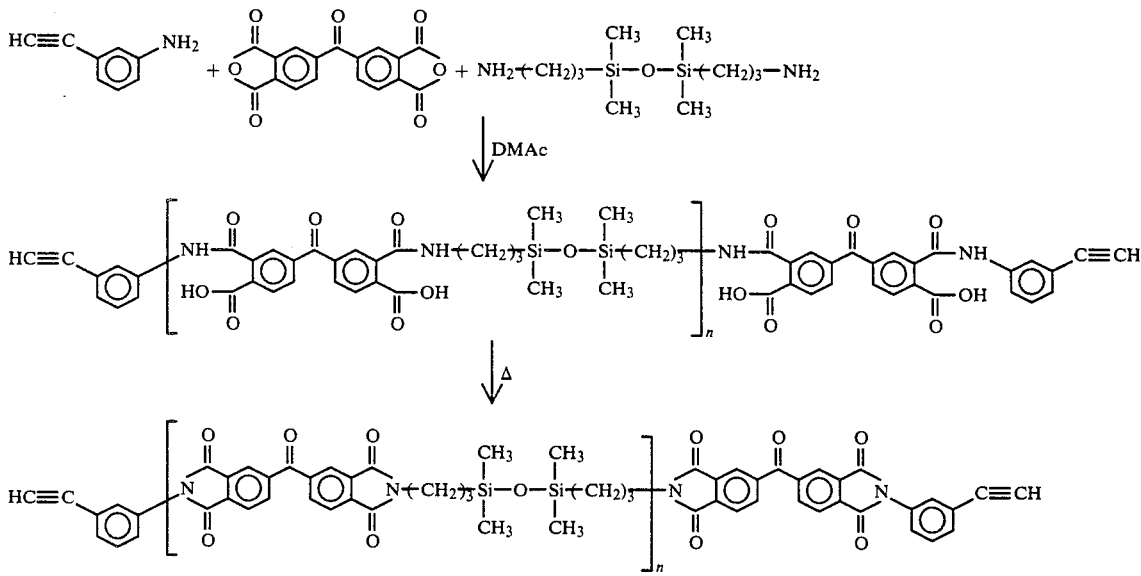

where n is 1, 2, or 3
when n is 1, the oligomer is designated ATPISi-1n
when n is 2, the oligomer is designated ATPISi-2n
when n is 3, the oligomer is designated ATPISi-3n.

Scrim cloths can be prepared of these polymers by the conventional method of repeatedly coating on glass cloth, allowing to air dry, then imidizing thermally. Scrim cloths can also be prepared by melt impregnating glass cloth with dry resin powder using localized heating, thus obviating the need for solvents which are difficult to remove. Adhesive bonds using these scrim cloths have comparable lap shear strengths.

Composites prepared from these oligomers can be thermoformed at elevated temperatures after an initial molding in the 175°-200° C. temperature range due to the lowered melting temperatures. A range of service temperatures result by blending the oligomers with various acetylene terminated polymers in different proportions.

These polymers may be useful in the form of structural adhesives as well as composite matrix material. Thus, the polymer solution may be coated on glass cloth, dried and then thermally imidized to give an adhesive scrim cloth. Alternately, the material can be melt impregnated on glass cloth. Scrim cloths prepared by either of these methods may be used to press bond metals and composites. Such bonds have afforded superior lap shear strengths at room temperature and elevated temperature after prolonged periods of time at 200° C. as illustrated in Table I.

TABLE I

| | Lap Shear Strength*, psi | | | | | | | |
|---|---|---|---|---|---|---|---|---|
| | Unaged | | Aged for | | | | | |
| | | | 175 hours | | 350 hours | | 625 hours | |
| Oligomer | RT | 200° C. | RT | 200° C. | RT | 200° C. | RT | 200° C. |
| ATPISi—1n | | | | | | | | |
| A** | 2393 | 1870 | 2470 | 1988 | 2137 | 2043 | 2185 | 2188 |
| B*** | 1950 | 2125 | 1663 | 2345 | 1978 | 2383 | 2098 | 2465 |
| ATPISi—2n | | | | | | | | |
| A** | 3410 | 1138 | 2880 | 1085 | 2962 | 900 | 2768 | 943 |
| B*** | 3340 | 980 | 2963 | 808 | 2760 | 1013 | 2488 | 1023 |
| ATPISi—3n | | | | | | | | |
| A** | 3925 | 448 | 3703 | 378 | 3320 | 355 | 3018 | 300 |
| B*** | 3945 | 425 | 3283 | 378 | 3245 | 410 | 2898 | 370 |

*each value average of 4 data points
**A - scrim cloth prepared from resin solution
***B - scrim cloth prepared by melt impregnating dried resin precipitated in water.

Each of these polymers may also be used to coat graphite woven cloth. After drying, the resins may be thermally imidized to produce material having drape and tack and which can be easily cut and formed into shaped layups. These may then be molded under heat and pressure to give the desired laminate.

Also, each of these polymers may be blended with acetylene terminated oligomers of all kinds and used to prepare laminates.

Such laminates have superior properties in terms of glass transition temperature, flexural strength and modulus and short beam shear strengths as illustrated in Tables II and III.

TABLE II

MECHANICAL PROPERTIES OF SILOXANE CONTAINING OLIGOMER LAMINATES

| Oligomer | Softening* Temperature (°C.) | Flexural** Strength (Ksi) | Flexural** Modulus (Msi) | Short Beam*** Shear Strength (Ksi) |
|---|---|---|---|---|
| ATPISi—1n | 200 | 117.2 | 9.72 | 6.38 |

TABLE II-continued
MECHANICAL PROPERTIES OF SILOXANE CONTAINING OLIGOMER LAMINATES

| Oligomer | Softening* Temperature (°C.) | Flexural** Strength (Ksi) | Flexural** Modulus (Msi) | Short Beam*** Shear Strength (Ksi) |
|---|---|---|---|---|
| ATPISi—2n | 157 | 136.4 | 7.51 | 7.25 |
| ATPISi—3n | 130 | 148.6 | 8.88 | 7.00 |

*as determined by torsional braid analysis
**average of 4 data points
***average of 10 data points

TABLE III
MECHANICAL PROPERTIES OF THERMID 600/ATPISi—2n OLIGOMER BLEND LAMINATES

| % ATPISi—2n | Flexural* Strength (Ksi) | Flexural* Modulus (Msi) | Short Beam** Shear Strength (Ksi) |
|---|---|---|---|
| 90 | 131.9 | 7.62 | 7.38 |
| 80 | 136.3 | 7.24 | 7.83 |
| 70 | 109.9 | 7.32 | 7.57 |
| Thermid 600 | 128.8 | 7.64 | 7.41 |

*average of 4 data points
**average of 10 data points

SPECIFIC EXAMPLES

A more complete appreciation of the invention and many of the attendant advantages thereof will be better understood when considered by reference to the following specific Examples.

EXAMPLE I 0.089 moles of aminophenyl acetylene (APA) were dissolved in 94.2 g of dimethylacetamide (DMAc). 0.089 moles of benzophenonetetracarboxylic dianhydride (BTDA) were added and the solution stirred at room temperature for one hour. 0.0445 moles of bis(γ-aminopropyl)tetramethyldisiloxane (BADS) were added and the solution stirred for a further one and one-half hours. This oligomer can be used for prepregging onto graphite cloth for composite for laminate fabrication and is designated ATPISi-1n in the preceding Tables.

EXAMPLE II 0.059 moles of APA were dissolved in 94.2 g of DMAc. 0.088 moles of BTDA were added and the solution stirred for one hour at room temperature. 0.059 moles of BADS were added and stirring continued for ninety minutes to give an oligomer designated ATPISi-2n in the Tables.

EXAMPLE III 0.044 moles of APA were dissolved in 94.2 g of DMAc. 0.088 moles of BTDA were added and the solution stirred for one hour at room temperature. 0.066 moles of BADS were added and stirring continued for ninety minutes. This oligomer is designated ATPISi-3n in the Tables.

EXAMPLE IV

The oligomers prepared in Examples I–III were brush coated onto 112E glass cloth (A-1100 finish), air dried for thirty minutes and dried in a forced air oven for thirty minutes at 140° C. This procedure was repeated until the scrim cloth was 12 to 16 mils thick and retained a high degree of flexibility and tack.

EXAMPLE V

The oligomers prepared in Examples I–III were precipitated in rapidly stirred water, filtered and dried 24 hours in a vacuum oven at 90° C. Approximately 1 g of the thoroughly dried powder was spread over one inch by one inch 112E glass cloth (A-1100 finish), placed between Kapton ® film and heated to 175° C. at 75° C./minute under contact pressure. It was then cooled to RT before removing from press.

EXAMPLE VI

Four fingered titanium panels, cleaned by Pasa Jell 107 treatment, were primed with oligomer as prepared in Examples I–III, air dried fifteen minutes and then placed in a forced air oven at 140° C. for thirty minutes. The panels were assembled with a scrim cloth prepared as in Examples IV-V covering a one-half inch overlap, and shimmed in a jig for a fixed bondline thickness of 2 to 4 mils. A bondline pressure of 100 psi was maintained throughout the bonding procedure. A 5° C./min heating rate was used from RT to 275° C. Specimens were held at this temperature under pressure for sixty minutes, and then heated to 300° C. at the same rate before cooling under pressure to a temperature below 100° C. and removing from press.

EXAMPLE VII

Lap shear strengths of the bonds were tested according to ASTM D-1002. For elevated temperature tests, specimens were soaked for ten minutes at temperature prior to testing. Isothermal aging of samples was conducted in forced air ovens at 200° C. The results are shown in Table I above. All bonds showed lap shear strengths comparable to those reported for other acetylene terminated systems. Lap shear strengths at RT increased in the order:

ATPISi-3n > ATPISi-2n > ATPISi-1n

Strengths of ATPISi-2n and ATPISi-3n whose Tgs are 157° and 130° C., respectively, were drastically reduced at 200° C. However, that of ATPISi-1n was unaffected by the elevated temperature and by prolonged aging at 200° C.

EXAMPLE VIII

The oligomers prepared in Examples I–III were brush coated onto graphite (Celion 1000) woven cloth, HMF W-1342, 5HS by Fiberite. The prepregs were dried at 100° C. for one-half hour and imidized at 130° C. for one hour between coats. At this point the material had drape, tack and could be easily cut and formed into shaped layups.

EXAMPLE IX

The prepreg formed in Example VIII was cut into strips three inches by 5 inches to closely fit a flat, matched metal mold whose open ends allowed observation of resin flow during molding. Twelve plies were stacked in the mold and pressed between platens preheated to 200° C. A pressure of 1000 psi was applied and the laminate cured for one hour. The laminate was allowed to cool to room temperature under the same pressure. Sufficient bleed out of resin resulted in composites with a fiber content of 50% by weight.

The press molded composites of the present invention demonstrate that these resin systems overcome one major obstacle previously noted in processing polyimides, i.e., lack of flow. The imidized material of the present invention flowed readily when heated about 170° C. At a heating rate of 5° C./min, the resin proceeded smoothly through the liquid state to a cross-linked system.

EXAMPLE X

The oligomers prepared as in Examples I-III have been blended with Thermid 600 in varying proportions. Thus, a 50 w/v solution of Thermid 600 in NMP was blended with a 50% w/v solution of each oligomer in varying proportions (10, 20, 30, 50, 90%). Each solution was formed into a prepreg as described in Example VIII and laminated to give a graphite reinforced composite as described in Example IX.

EXAMPLE XI

Mechanical properties of the laminates were tested in a Instron Testing Machine Model TT-6. Flexural strengths and moduli were determined according to ASTM D790. The short beam shear strengths were determined using a span-to-thickness ratio of 4. Glass transition or softening temperatures were determined by dynamic mechanical analysis on a DuPont Model 981 Dynamic Mechanical Analyzer (DMA). The results are shown in Table II.

All laminates showed strengths comparable to those fabricated using Thermid 600, the commercially available acetylene terminated oligomer. The resins were tested and found to be compatible with Kerimid 601 a commercial bismaleimide from Rhodia. A 50—50 mixture appears to afford the best mix of properties in terms of strength and service temperature (Table II).

The specific Examples described herein are to merely illustrate the invention and are not to be deemed as exhaustive. For example, although the solvent described in each specific Example was N-methylpyrrolidone (NMP), other solvents useful in practice of the invention include N,N-dimethylformadide (DMF), N,N-dimethylacetamide (DMAc), bis(2-methoxyethyl)ether (diglyme), dimethylsulfoxide (DMSO), tetrahydrofuran (THF), and mixtures of one or more of each of these.

Also, only bis(γ-aminopropyl)tetramethyldisiloxane was used in the specific Examples, it is to be understood that other siloxane containing diamines are equally applicable for use in the present invention as would be obvious to those skilled in the art.

Further, although aminophenyl acetylene (APA) was used for acetylene termination in the specific Examples, other acetylene terminating moieties may be used and will be readily apparent to those skilled in the art. Thus, various modifications and variations of the present invention will be apparent to those skilled in the art in the light of the above teachings without departing from the spirit and scope of the appended claims.

What is claimed as new and desired to be secured by Letters Patent of the United States is:

1. A composition of matter consisting of a blend containing (a) 90–10% of an acetylene terminated oligomer having the formula:

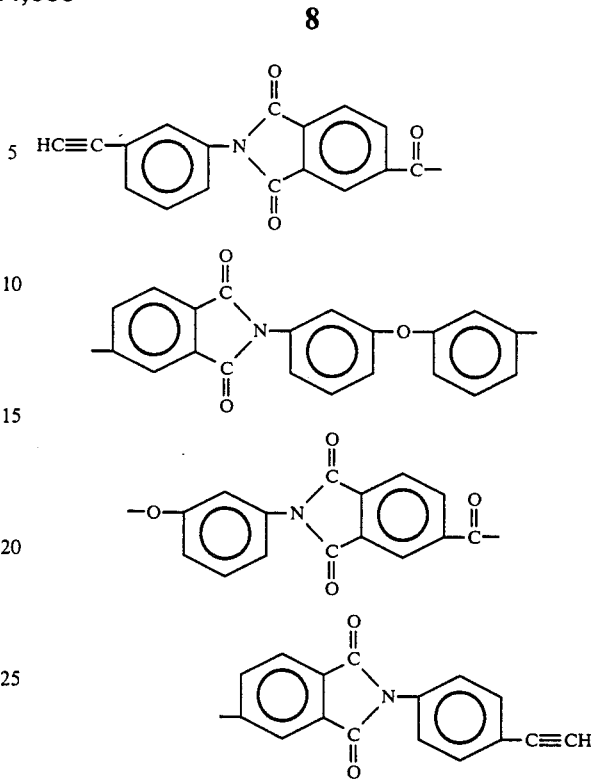

and (b) 10–90% of the oligomer produced by:
  combining an aminiophenylacetylene and an aromatic dianhydride in molar ratio quantities selected from the molar ratio group consisting of 1:1, 2:3, and 1:2 molar ratios in a solvent;
  permitting the combined solution to react for approximately one hour;
  adding a quantity of a diaminosiloxane to the reacted solution equal to a 0.5, 2, and 1.5 multiple of the respective molar ratio quantity selected for the aminophenylacetylene and aromatic dianhydride; and
  permitting the resulting solution to react for approximately one and one-half hours at room temperature.

2. The composition of claim 1, wherein the aromatic dianhydride is selected from the group consisting of:
  (a) benzophenone tetracarboxylic dianhydride;
  (b) pyromellitic dianhydride;
  (c) oxydiphthalic anhydride;
  (d) 2,2-bis(3,4-dicarboxyphenyl)hexafluoropropane dianhydride; and
  (e) 4,4'-bis(3,4-dicarboxyphenoxy)diphenyl sulfide dianhydride.

3. A prepreg prepared by applying the oligomer blend of claim 1 onto a graphite cloth, air drying the coated graphite cloth for approximately one-half hour at approximately 100° C., and imidizing for approximately one hour at approximately 130° C. to yield a prepreg having improved physical properties of drape, tack, and adaptability for cutting and forming into shaped layers.

4. A shaped composite article prepared by cutting the prepreg of claim 3 into a plurality of segments having the desired shape and size, stacking the cut segments into a multiplied preform, heating the preform to approximately 200° C. and maintaining this temperature while applying to the preform a pressure of approximately 1000 psi for approximately one hour, and maintaining this pressure while permitting the resulting laminate to cool to room temperature.

5. The shaped composite article of claim 4, wherein the preform is heated to approximately 200° C. at a rate of 5° C. per minute so that a smooth transition of the imidized polymer is effected through the liquid state into a final crosslinked system.

* * * * *